W. L. BLISS.
GENERATOR SUSPENSION.
APPLICATION FILED OCT. 23, 1912.

1,193,227.

Patented Aug. 1, 1916.
2 SHEETS—SHEET 1.

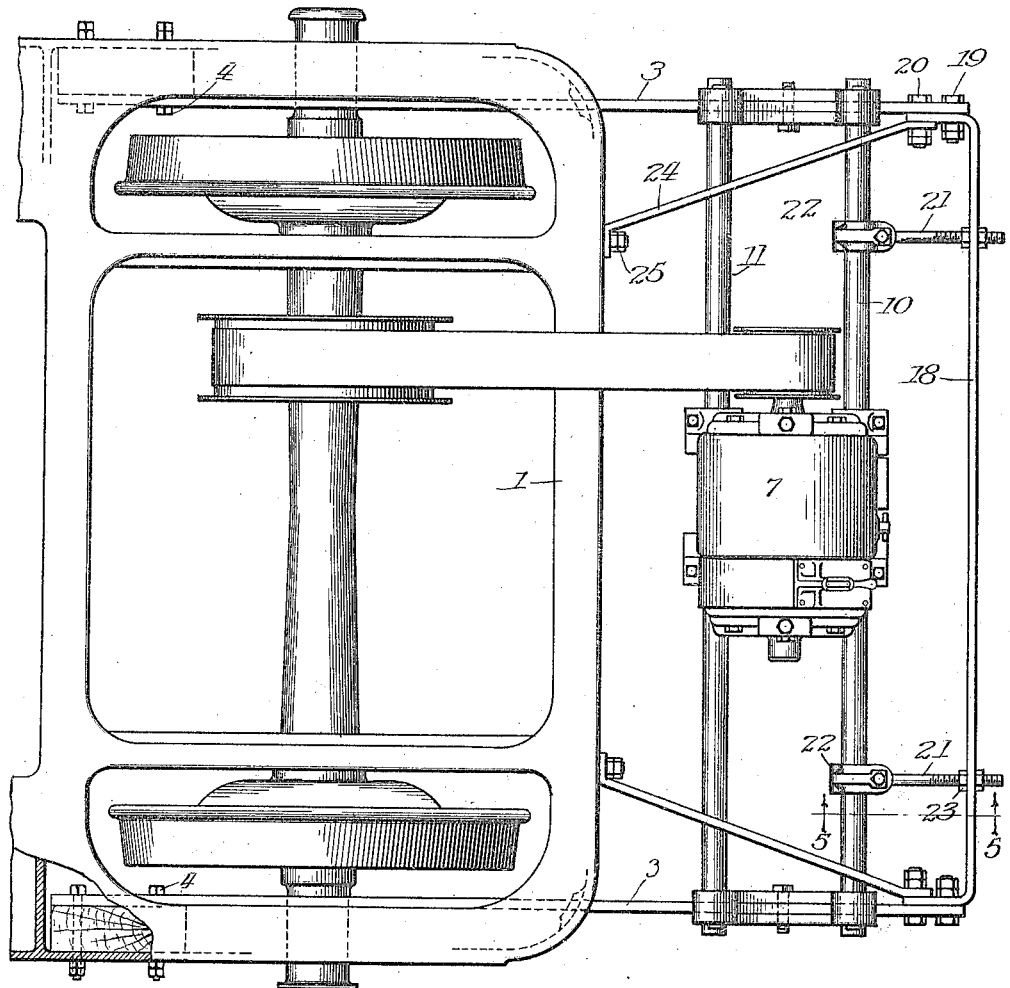

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

GENERATOR SUSPENSION.

1,193,227.      Specification of Letters Patent.      Patented Aug. 1, 1916.

Application filed October 23, 1912. Serial No. 727,316.

*To all whom it may concern:*

Be it known that I, WILLIAM L. BLISS, a citizen of the United States, residing at Niagara Falls, in the county of Niagara and State of New York, have invented new and useful Improvements in Generator Suspensions, of which the following is a full, clear, concise, and exact description, reference being had to the accompanying drawing, forming a part of this specification.

My invention relates to generator suspensions.

It has among its objects to provide improved means for supporting a generator especially adapted to use in connection with those generators used in electric car lighting wherein the generator is supported beyond the end sill of the car truck.

A further object of my invention is to provide an improved and rigid support for the generator and improved means for adjusting the latter thereon.

Other objects and advantages of my invention will hereinafter appear.

In order that my invention may be fully and clearly disclosed, I have illustrated one embodiment of the same in the accompanying drawings.

Figure 1:
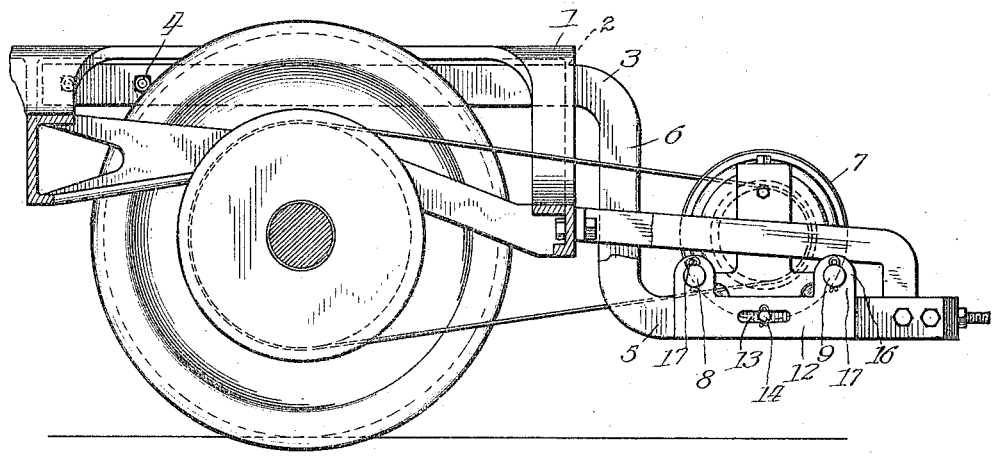
Figure 2:
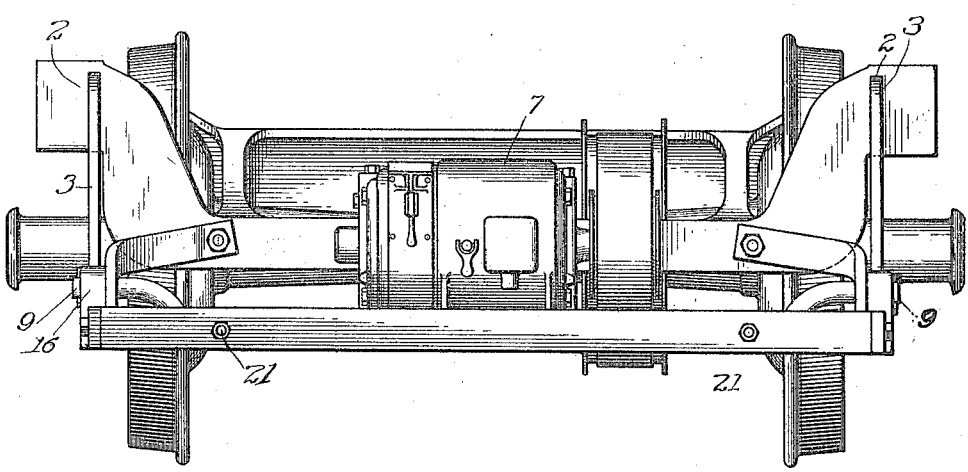

Figure 1 shows a side elevation of the suspension in position upon a truck, portions of the latter being broken away. Fig. 2 shows an end elevation of the suspension in position upon the truck. Fig. 3 shows a top plan view of the suspension and truck. Fig. 4 is a detail view of one of the saddle members. Fig. 5 is a sectional view on line 5—5 of Fig. 3.

I have illustrated a truck 1 of the steel truck type. This truck has openings 2 in one end of the same through which protrude suspension bars 3. The inner ends of these suspension bars are suitably fixed to the truck, as by bolts 4. The outer ends of these bars are bent into substantially L shape having depending horizontal portions 5 connected to the body portions 3 by means of vertical portions 6. The generator 7 is supported on a pair of transversely extending parallel cross rods 8 and 9 carried by the horizontal portions 5 of the suspension bars in a manner hereinafter described. The cross rods 8 and 9 are herein shown as formed of round rods having horizontally disposed depending portions 10 and 11 between their ends. The ends of these rods or bars are seated in suitable saddles 12 which are each adjustably attached to the horizontal portions 5 of the suspension bars by means of a slot and bolt connection 13 and 14. As shown in Fig. 4, a longitudinally extending groove 15 is provided in the side of each of these saddles so that the same may be set down upon or straddle the portions 5 and fit snugly but slidably thereon. Upon each end of the saddles 12 extensions 16 are provided having openings therein arranged to receive the ends of the rods or bars 8 and 9. In order to hold the latter in position, suitable cotter pins 17 may be inserted in the ends of the same outside of the saddles 12.

In order to position the bars 10 and 11 and the generator, I preferably connect the outer rod or bar 10 with a transversely extending bar 18 which is suitably fixed to the protruding ends of the suspension bars, as, for instance, by means of bolts 19 and 20. Between this bar 18 and the bar or rod 10 and near the opposite ends of the latter, extend threaded bolts 21, the inner ends of which are adjustably attached to the bar 10 by means of an adjustable clamping collar 22, while the outer ends extend through openings in the bar 18 and are attached thereto by nuts 23. Obviously, in order to provide a more rigid support, the suspension bars and the bar 18 may be supported by diagonal braces 24 preferably attached to the inner end of the bolt 20 and extending diagonally across the suspension and upward to a suitable position upon the truck to which they may be attached by bolts 25.

The generator 7 is carried above the rods 8 and 9 so that it is disposed in a plane above the horizontal portions 5 of the suspension bars and is freely accessible to a person desiring to adjust it or to change the tension of the belt. In a preferred form the generator is provided with the usual foot caps and clamping collars which are adjustable as desired.

When it is desired to adjust the generator longitudinally of the truck, it is only necessary to adjust the several nuts and slide the saddles 12 to the desired position. Obviously, the generator may be either moved bodily to the desired position or by adjusting one or the other of the said saddles, the generator may be skewed into position.

When it is desired to adjust the generator transversely of the truck, that is, along the bars or rods 10 and 11, the same may be moved by simply adjusting the foot caps and clamping collars of the same in the usual manner. The generator is thus adapted to adjustment in either a longitudinal, transverse, or angular direction in order to permit of the proper tensioning of the belt.

By my improved construction I have provided a suspension which permits ready access to the generator, the supporting means being arranged below the generator so that one desiring to adjust the belt or the generator may readily reach the desired parts. The generator is securely held upon the suspension bars, but at the same time may be readily removed therefrom. The parts of the suspension may be very readily assembled and are further of an exceedingly rugged construction which may be very readily and cheaply manufactured. It is to be noted that by bending the suspension bars, I am able to strengthen the same and thus provide a rigid suport for the generator which is not liable to distortion in service.

While I have described one form of my invention in this application in order to disclose the same, it is, of course, to be understood that the construction herein shown may be modified without departing from the spirit of my invention.

What I claim as new and desire to secure by Letters Patent of the United States is:—

1. A generator suspension comprising a pair of parallel suspension bars each having portions thereof in different horizontal planes, a plurality of cross-bars adjustably mounted on said suspension bars and extending from one to the other thereof and a generator carried by said cross-bars, said generator being rigidly but adjustably mounted with respect to said suspension bars.

2. A generator suspension comprising suspension bars having portions thereof in different horizontal planes, a plurality of generators supporting members carried by said bars and a generator carried by said supporting members, said generator being rigidly but adjustably mounted with respect to said suspension bars.

3. A generator suspension comprising suspension bars having vertically extending portions and elongated horizontal extensions thereon, a pair of rods adjustably supported on said extensions and a generator carried by said rods, said generator being rigidly but adjustably mounted with respect to said suspension bars.

4. A generator suspension comprising parallel suspension bars and supports carried by each of said bars and adjustable with respect thereto, said supports being adapted to support a generator above said bars.

5. A generator suspension comprising parallel suspension bars, saddles straddling said bars and adjustably secured thereto, and a pair of parallel rods having their ends protruding through openings in each of said saddles.

6. A generator suspension comprising suspension bars, grooved saddles straddling said bars and adjustably secured thereto, a pair of horizontally disposed parallel rods secured to said saddles, and a generator supported by said rods.

7. A generator suspension comprising parallel suspension bars, grooved saddles straddling said bars and adjustable longitudinally with respect thereto, a pair of parallel rods having their ends protruding through openings in each of said saddles and adjustable with the latter, and a generator supported by said rods.

8. A generator suspension comprising a pair of parallel suspension bars, grooved saddles straddling the same and adjustable longitudinally thereon, a pair of parallel rods rigidly attached to the upper ends of said saddles, and a bolt attached to one of said rods and having its outer end fixed to said suspension bars.

9. A generator suspension comprising a pair of parallel suspension bars having horizontal portions thereof disposed in different horizontal planes, adjustable grooved members straddling certain of the horizontal portions of said bars, a pair of parallel rods connecting the said bars and having their ends received in openings in said grooved members, a generator supported upon said rods and connecting the same, and adjustable means between the end of the suspension frame and one of said rods for adjusting the latter.

In witness whereof, I have hereunto subscribed my name in the presence of two witnesses.

WILLIAM L. BLISS.

Witnesses:
  WM. A. TURBAYNE,
  A. W. DONOP.